Figure 1:
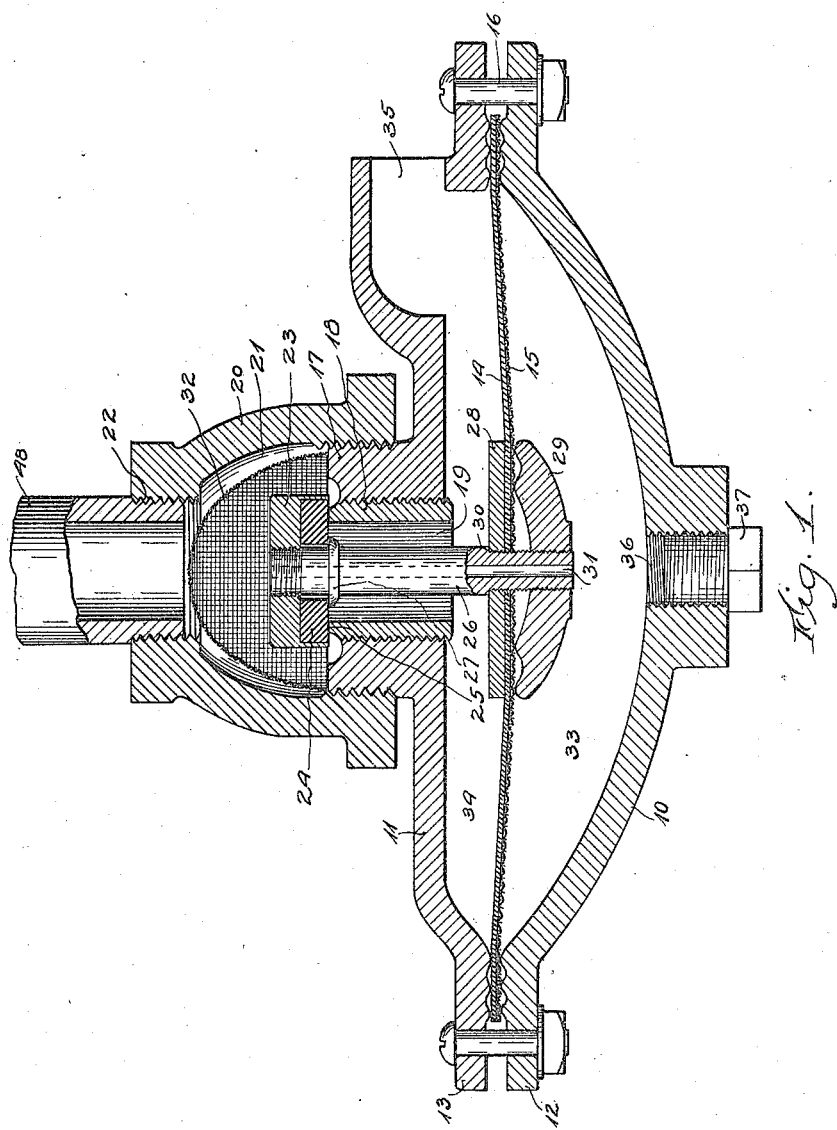

W. SHURTLEFF.
VACUUM VALVE.
APPLICATION FILED JUNE 11, 1917.

1,267,809.

Patented May 28, 1918.
2 SHEETS—SHEET 1.

INVENTOR.
Wilfred Shurtleff,
BY James R. Offield,
ATTORNEY.

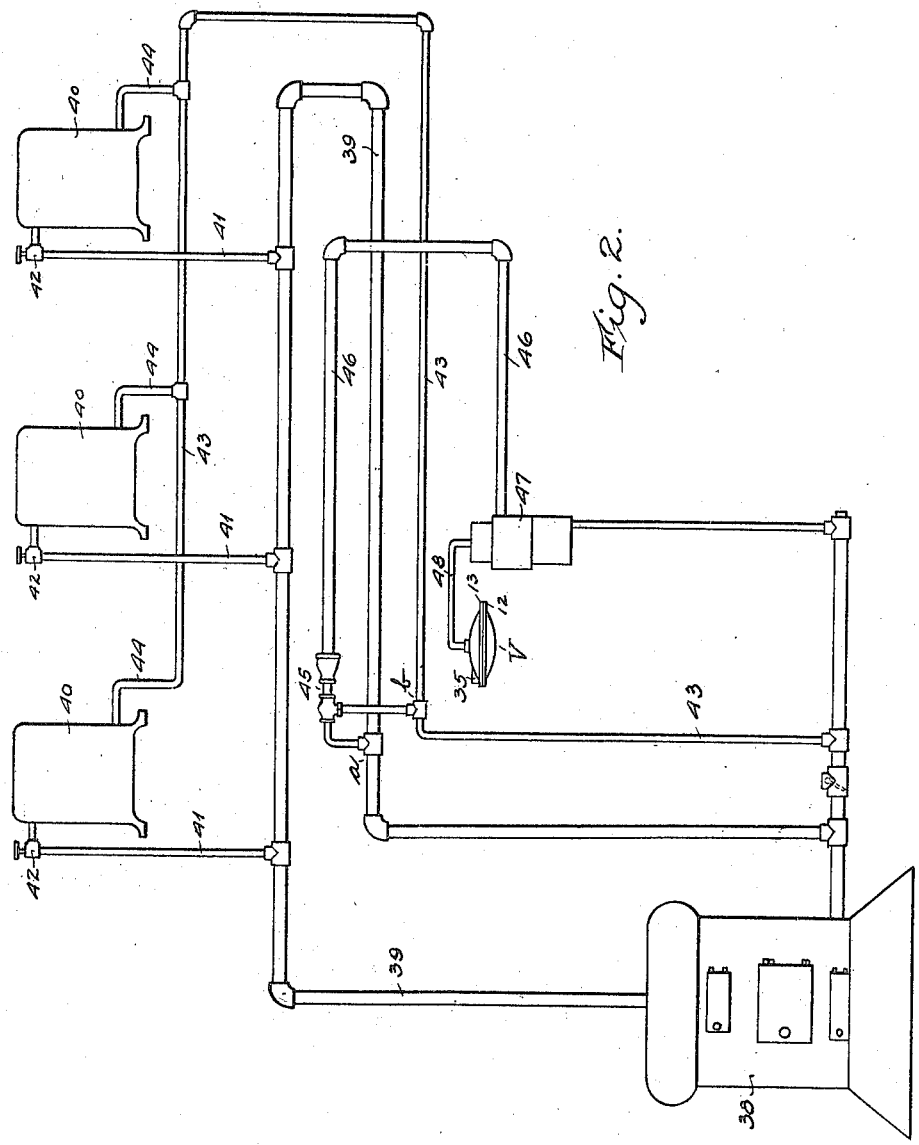

UNITED STATES PATENT OFFICE.

WILFRED SHURTLEFF, OF MOLINE, ILLINOIS.

VACUUM-VALVE.

1,267,809.        Specification of Letters Patent.        Patented May 28, 1918.

Application filed June 11, 1917. Serial No. 174,024.

*To all whom it may concern:*

Be it known that I, WILFRED SHURTLEFF, a citizen of the United States, and a resident of Moline, in the county of Rock Island and State of Illinois, have invented certain new and useful Improvements in Vacuum-Valves, of which the following is a specification.

My invention relates to vacuum heating systems and particularly to an improved vacuum valve for controlling the outflow of air from the system and for preventing the return flow of air thereto.

My invention may be considered as an improvement over the invention disclosed in Patent No. 930,893 issued August 10, 1909, to Frank Shurtleff. In the vacuum system of this patent a valve outfit is used for controlling the outflow and preventing the inflow of air, such outfit consisting of a vacuum valve structure and an auxiliary check valve which is necessary to initially produce a slight vacuum for enabling the diaphragm valve to close. Ordinary check valves give considerable trouble in heating systems and therefore an important object of my invention is to produce a vacuum valve which does not require an auxiliary check valve for its operation but which will of itself effectively control the outlet of air and prevent return of air into the system. By the elimination of the troublesome auxiliary check valve the efficiency is increased and the cost reduced.

On the accompanying sheet of drawings Figure 1 is a vertical diametral sectional view of my improved vacuum valve, and Fig. 2 is a diagrammatical view of a system showing the location and connection of the vacuum valve therein.

Referring to Fig. 1, the valve housing or casing comprises a lower concave frame 10 and a top concave frame 11 between whose flanges 12 and 13 a flexible diaphragm 14 is clamped at its periphery, this diaphragm being preferably of rubber and reinforced by a flexible disk 15 preferably of wire screen also clamped at its periphery between the frame flanges. Bolts 16 are preferably used to clamp the frames together and to permit separation thereof when desired. Extending upwardly from the top frame 11 is the cylindrical lug 17 which is interiorly threaded to receive the valve seat bushing 18 which surrounds the axial passageway 19. Engaging at its lower end with the exterior threads of the lug 17 is the dome-shaped frame 20 forming the valve chamber 21, the upper end of this frame having the threaded opening 22 for receiving the end of a pipe or fitting.

Within the valve chamber 21 is the circular valve disk 23 having the facing washer or pad 24 of rubber, leather, or other suitable material for engaging with the upper edge 25 of the bushing 18 to close the passageway 19. A stem 26 threads into and extends downwardly from the valve disk 23 and has the abutment collar 27 thereon for assisting in holding the pad 24 in position. The stem extends through the passageway 19 and through the diaphragm to which it is clamped between the plate 28 and the nut 29, the plate 28 abutting against the collar 30 on the stem and the nut engaging with the threads at the stem end. The stem has the passageway 31 extending longitudinally therethrough from end to end and of a comparatively small diameter. Within the valve chamber 21 a hood 32 of wire screen or other straining material is applied around the valve and over the passageway 19 for protecting the valve seat from dirt.

Between the lower housing frame 10 and the diaphragm is the chamber 33 and between the diaphragm and the upper frame 11 is the chamber 34, this chamber 34 having an outlet passageway 35 communicating with the atmosphere. In the bottom of the frame 10 is a cleaning opening 36 provided with a removable plug 37.

Under neutral conditions, that is, when there is neither pressure nor vacuum in the diaphragm chambers, the valve rests on its seat to close the passageway 19, the plate 28 and nut 29 acting as a weight to insure such seating. When the pressure in the valve chamber 21 becomes greater than that of the atmosphere such pressure will be communicated to the diaphragm chamber 33 through the valve stem passageway 31 and the area of the diaphragm being considerably greater than that of the valve, and the diaphragm chamber 34 being always open to atmosphere through passageway 35, the result will be that the valve will be raised from its seat and held in such raised position so long as the pressure in the valve chamber exceeds that of the atmosphere, and there will be a flow from the valve chamber through the passageway 19 and to atmosphere through passageway 35. When the pressure in the valve chamber 21 decreases and approaches that of the atmosphere, the weighted valve will drop to close the passageway 19, then when the pressure in the valve chamber becomes less than that of the atmosphere, such lower pressure communicated to the lower diaphragm chamber 33 through the valve stem passageway will act on the diaphragm to cause it to hold the valve securely against its seat, the upper diaphragm chamber 34 remaining at atmospheric pressure.

In Fig. 2, the connection of my improved vacuum valve in a heating system is shown. 38 represents a boiler from which the generated vapor or steam will flow through the supply pipe 39 to be distributed to the radiators 40 through branch pipes 41 whose connections with the radiators are controlled by individual inlet valves 42. The end of the supply pipe connects with the boiler below the water level therein. 43 represents the return pipe to which the various radiators are connected by branch pipes 44. 45 represents an ejector whose body is connected with the return pipe 43 and whose inlet end is connected with the supply pipe while its outlet end connects with the condenser pipe or coil 46, the ejector forcing the air and vapor from the return pipe into the condenser. 47 represents an air relief valve which may be such as is disclosed in my Patent No. 1,162,661 dated November 30, 1915, the relief valve serving to vent the air from the system but to prevent escape of vapor or steam. V represents my improved vacuum valve whose inlet opening 22 is connected by the pipe 48 with the air outlet of the air relief valve. When the boiler is started steam will be generated and the increased pressure will drive the steam through the steam supply pipe 39 to the radiators, filling them with steam. The steam as it enters the radiators pushes the air before it through the branch pipes 44 to the return pipe 43, the ejector then forcing this air into and through the air relief valve from where it flows through pipe 48 to the valve chamber 21 of the vacuum valve V. The pressure of this driven air being greater than that of atmosphere, the vacuum valve will be opened to permit escape of the air through passageway 35. As explained in my Patent No. 1,162,661 referred to, the air relief valve is closed as soon as hot vapor or steam reaches it and heats it after expulsion of the air from the system. When the air relief valve is closed the pressure in the vacuum valve chamber 21 will be reduced and the valve 23 will be seated by gravity.

When the pressure in the heating system becomes less than that of atmosphere, as when condensation results when one or more of the radiators are shut off and become cooled, air will tend to flow through the vacuum valve atmosphere passageway and through the relief valve back into the return pipe and into the radiators. The vacuum valve prevents this, for as soon as the pressure in the system falls below that of atmosphere, the pressure in the lower diaphragm chamber 33 is reduced below that of the atmospheric pressure above the diaphragm, and the vacuum valve will be firmly held down on its seat to securely close the passageway 19 against the return flow of air to the system. When the pressure in the system again rises sufficiently the vacuum valve will be re-opened for the escape of air. Any solid particles or dirt in the air or vapor flowing from the system are obstructed by the screen 32 so that the valve seat 25 is kept clean for the accurate seating of the valve 23.

My improved vacuum valve thus efficiently and accurately and positively operates to permit outflow of air from the heating system but to prevent return flow of air, and the vacuum valve requires no check valve nor other auxiliary fitting or mechanism for its operation. Its construction is so simple it can be inexpensively manufactured. Not only is the valve useful in connection with heating systems but it can also be utilized in other fields for controlling the inflow and outflow of gases or fluids.

Changes and modifications can no doubt also be made without departing from the spirit of the invention.

I claim as follows:

1. In a vacuum check valve for heating systems, the combination of a casing, a diaphragm dividing said casing into an upper diaphragm chamber and a lower diaphragm chamber, a valve chamber formed in said casing above said upper diaphragm chamber and adapted for connection with a heating system to receive fluid under pressure, a passageway for connecting said valve chamber and upper diaphragm chamber, a valve in said valve chamber for controlling said passageway and connected to be shifted by said diaphragm, said upper diaphragm chamber being always open to atmosphere and said lower diaphragm chamber being always in communication with said valve chamber.

2. In a vacuum check valve for heating systems, the combination of a casing, a diaphragm dividing said casing into an upper diaphragm chamber and a lower diaphragm chamber, a valve chamber formed in said chamber above said upper diaphragm chamber and adapted for connection with a heating system to receive fluid under pressure, a passageway for connecting said valve chamber and upper diaphragm chamber, a valve in said valve chamber for controlling said passageway and connected to be shifted by said diaphragm, said upper diaphragm chamber being always open to atmosphere and said lower diaphragm chamber being always in communication with said valve chamber, said lower diaphragm chamber being otherwise closed.

3. In a vacuum check valve for heating systems, the combination of a casing, a diaphragm dividing said casing into an upper diaphragm chamber and a lower diaphragm chamber, a valve chamber above the upper diaphragm chamber adapted for connection in a heating system to receive fluid under pressure, a valve port between said valve chamber and upper diaphragm chamber controlled by said valve, said upper diaphragm chamber being always open to atmosphere, said valve being connected with said diaphragm to be shifted thereby and having a passageway therethrough for connecting the lower diaphragm chamber with the valve chamber.

4. In a vacuum check valve for heating systems, the combination of a casing, a diaphragm dividing said casing into an upper diaphragm chamber and a lower diaphragm chamber, a valve chamber above the upper diaphragm chamber, a valve port between said valve chamber and upper diaphragm chamber, a valve in said valve chamber for controlling said port, a stem extending from said valve through said port and secured to the diaphragm, there being a passageway through said valve and stem for connecting the valve chamber with the lower diaphragm chamber, said upper diaphragm chamber being open to atmosphere, said valve being shifted by the diaphragm to open the port when the pressure in the valve chamber is greater than atmosphere pressure, and the valve being shifted to close the port when the pressure in the valve chamber is less than that of atmosphere.

5. In a vacuum check valve for heating systems, the combination of a casing, a diaphragm dividing said casing into an upper diaphragm chamber and a lower diaphragm chamber, a valve chamber formed in the casing above the diaphragm chamber, a port for connecting said valve chamber and diaphragm chamber, a valve in said valve chamber for controlling said port, a valve stem extending through said port and secured to the diaphragm, said lower diaphragm chamber being always in communication with said valve chamber and said upper diaphragm chamber being open to atmosphere, the weight of said valve structure and diaphragm tending to hold the valve in position to close said port, said valve structure being raised by the diaphragm to open the port when the pressure in the valve chamber is sufficiently greater than atmospheric pressure to overcome the weight of the valve structure and diaphragm, atmospheric pressure within the upper diaphragm chamber causing said diaphragm to securely hold the valve structure down to close the port when the pressure in the valve chamber is less than atmosphere.

6. In a vacuum check valve, the combination of a casing, a diaphragm dividing said chamber into an upper diaphragm chamber and a lower diaphragm chamber, a valve chamber formed in said casing above the upper diaphragm chamber adapted for connection with a fluid conductor, a port between said valve chamber and upper diaphragm chamber, a valve in said valve chamber for controlling said port, a stem extending from said valve through said port and secured to the diaphragm, said lower diaphragm chamber being in communication with said valve chamber and said upper diaphragm chamber communicating with atmosphere, said diaphragm comprising a rubber disk and a flexible metallic supporting disk therefor.

7. In a vacuum check valve, the combination of a casing, a diaphragm dividing said chamber into an upper diaphragm chamber and a lower diaphragm chamber, a valve chamber formed in said casing above the upper diaphragm chamber adapted for connection with a fluid conductor, a port between said valve chamber and upper diaphragm chamber, a valve in said valve chamber for controlling said port, a stem extending from said valve through said port and secured to the diaphragm, said lower diaphragm chamber being in communication with said valve chamber and said upper diaphragm chamber communicating with atmosphere, and a protecting screen over said valve.

8. In a vacuum check valve for heating systems, the combination of a casing, a diaphragm dividing said casing into an upper diaphragm chamber and a lower diaphragm chamber, a valve chamber formed in said casing above said upper diaphragm chamber and adapted for connection with a heating system to receive fluid under pressure, a passageway for connecting said valve chamber and upper diaphragm chamber, a valve in said valve chamber for controlling said passageway and connected to follow all the movements of said diaphragm, said upper diaphragm chamber being always open to atmosphere and said lower diaphragm chamber being always in communication with said valve chamber.

In witness whereof I hereunto subscribe my name this 31st day of May, A. D. 1917.

WILFRED SHURTLEFF.

Copies of this patent may be obtained for five cents each, by addressing the "Commissioner of Patents, Washington, D. C."